(12) United States Patent
Reboni et al.

(10) Patent No.: US 7,891,873 B2
(45) Date of Patent: Feb. 22, 2011

(54) SYSTEM FOR AUTOMATIC TESTING OF A DIGITAL X-RAY DETECTOR

(75) Inventors: Voldemar O. Reboni, St. Petersburg (RU); Dmitry A. Barannik, St. Petersburg (RU)

(73) Assignee: Zao "Impulse", St. Petersburg (RU)

( * ) Notice: Subject to any disclaimer, the term of this patent is extended or adjusted under 35 U.S.C. 154(b) by 0 days.

(21) Appl. No.: 12/391,850

(22) Filed: Feb. 24, 2009

(65) Prior Publication Data

US 2009/0285365 A1    Nov. 19, 2009

Related U.S. Application Data

(63) Continuation of application No. PCT/RU2008/000307, filed on May 19, 2008.

(51) Int. Cl.
*G01D 18/00* (2006.01)

(52) U.S. Cl. .................................. 378/207; 378/206

(58) Field of Classification Search .................. 378/63, 378/205–207
See application file for complete search history.

(56) References Cited

U.S. PATENT DOCUMENTS

| 6,086,252 | A  | * | 7/2000 | Quadflieg et al. ........... 378/207 |
| 6,869,218 | B2 |   | 3/2005 | Winsor |
| 2003/0118127 | A1 | | 6/2003 | Peting |
| 2003/0118152 | A1 | | 6/2003 | Winsor |
| 2003/0118227 | A1 | | 6/2003 | Winsor et al. |

FOREIGN PATENT DOCUMENTS

| CA | 2 412 711 A1 | 5/2003 |
| RU | 2 218 088 C1 | 12/2003 |

OTHER PUBLICATIONS

International Search Report, mailed Feb. 5, 2009, from International Application No. PCT/RU2008/000307, filed on May 19, 2008.

* cited by examiner

*Primary Examiner* — Hoon Song
(74) *Attorney, Agent, or Firm* — Houston Eliseeva, LLP.

(57) ABSTRACT

The present invention relates to radiography, including medical radiography, specifically to the apparatus for controlling the technical characteristics of digital radiographic devices, and is intended to maintain self-diagnostics of digital X-ray detectors. The self-diagnostics system of digital X-ray detectors comprises a radiographic screen positioned in the radiation pathway from the radiographic source, an optical transfer system for transmitting an image from the screen to the photosensitive CCD-matrix-based sensor, and incorporates at least three test structures installed in the emission plane of a radiographic screen. The technical result is achieved due to the fact that the test structures are positioned outside the radiographic screen emitting surface and are provided with controlled sources of primary radiation installed so that each test structure is located in the direct ray path from the said sources.

4 Claims, 2 Drawing Sheets

SYSTEM FOR AUTOMATIC TESTING OF A DIGITAL X-RAY DETECTOR

RELATED APPLICATIONS

This application is a Continuation of PCT application serial number PCT/RU2008/000307, filed on May 19, 2008, which is incorporated herein by reference in its entirety.

FIELD OF THE INVENTION

The present invention relates to radiography, including medical radiography, specifically to the apparatus for controlling the technical characteristics of digital radiographic devices, and can be used for testing of digital X-ray detectors.

BACKGROUND OF THE INVENTION

Digital detector of X-rays is an apparatus comprising a radiographic screen transforming the X-ray radiation into the visible one, an optical transfer system for transmitting an image to the photosensitive CCD-matrix (a group of photodetectors based on charge-coupled devices), which converts the image projected thereon into the digital signal. From the photosensitive CCD-matrix the digital signal passes into the image processing unit. Diagnostics of an investigated object is performed using the captured and appropriately processed image, therefore the quality of captured radiographic images is the most important parameter of such systems. The self-diagnostic system of image sharpness setting makes it possible to bring down the risks of wrong diagnosis based on the captured radiographic image by means of excluding usage of an X-ray detector showing inadequate image sharpness. Such fault is possible, for instance, at excessive mechanical loads experienced by a X-ray detector at incorrect transportation or improper operating methods.

A self-testing system is known (patent CA2412711, МПкA61B6/04, published 23, May 2003, equivalent patent U.S. Pat. No. 6,869,218) of image sharpness of a digital X-ray detector containing a radiographic screen installed in the radiation pathway from the radiographic source, and an optical transfer system for transmitting images from the screen to the photosensitive matrix of a charge-coupled device (hereafter referred to as CCD-matrix), whose output is connected to the image processing unit. The system incorporates test structures, which are located at the periphery of the screen emitting surface and outside its working zone, i.e. outside the zone of the images to be investigated, and made of a material that passes short ultraviolet waves. On the side of screen emitting surface there is a source of ultraviolet radiation of the given spectrum, which irradiates the area of the radiographic screen with the test structure. Having reached the radiographic screen, ultraviolet radiation is transformed into the visible one, which forms an image of the given test structure. When calibrating the X-ray detector, the reference images of test structures are registered and saved for the sake of comparing these with the images captured during operation.

With this system, sharpness of the captured image can be controlled only on condition of using the specified screen types having appropriate ultraviolet radiation absorption bands and appropriate radiation spectrum. Thus, choice of the radiographic screens that can be employed in these X-ray detectors is limited.

At partial coincidence of radiographic screen excitation spectra in the screen emission ultraviolet (hereinafter UV) range and the X-ray detector sensitivity in the UV range it is necessary to ensure radiation filtration in order to separate the reflected UV radiation from the secondary UV emission of the radiographic screen. This imposes additional requirements to optics and, consequently, entails a more complicated and more expensive construction. Application of these filters leads to a reduced input signal and, thus, requires increased dosage rate during radiographic investigations.

SUMMARY OF THE INVENTION

The objective of the present invention is to create a self-diagnostic system of digital X-ray detector image sharpness setting that provides the technical result consisting in the possibility of testing image sharpness of digital X-ray detectors with various screen types, in augmentation of valid input signal and in a reduced error.

In a self-diagnostics system of a digital X-ray detector comprising a radiographic screen positioned in the radiation pathway from the radiographic source, an optical transfer system for transmitting an image from the screen to the photosensitive CCD-matrix whose output is connected to the image processing unit, and comprising at least three test structures installed in the plane of radiographic screen emission, the above-mentioned technical result is achieved due to the fact that the test structures are positioned outside the radiographic screen emitting surface and are provided with controlled sources of primary radiation installed so that each test structure is located in the direct ray path from the said sources.

The best result is achieved when the said sources are light-emitting elements with a maximum of their spectral response characteristic being close to a transmission spectrum maximum of the image transfer optical system.

This task can be solved using light-emitting diodes radiating in the visible range.

In distinction from the prototype, self-diagnostic of sharpness setting is performed employing not the images of test structures in the secondary emission of a radiographic screen but the images of test structures located outside the screen emitting surface and provided with controlled sources of primary radiation positioned so that every test structure is in the direct ray path from the said sources.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
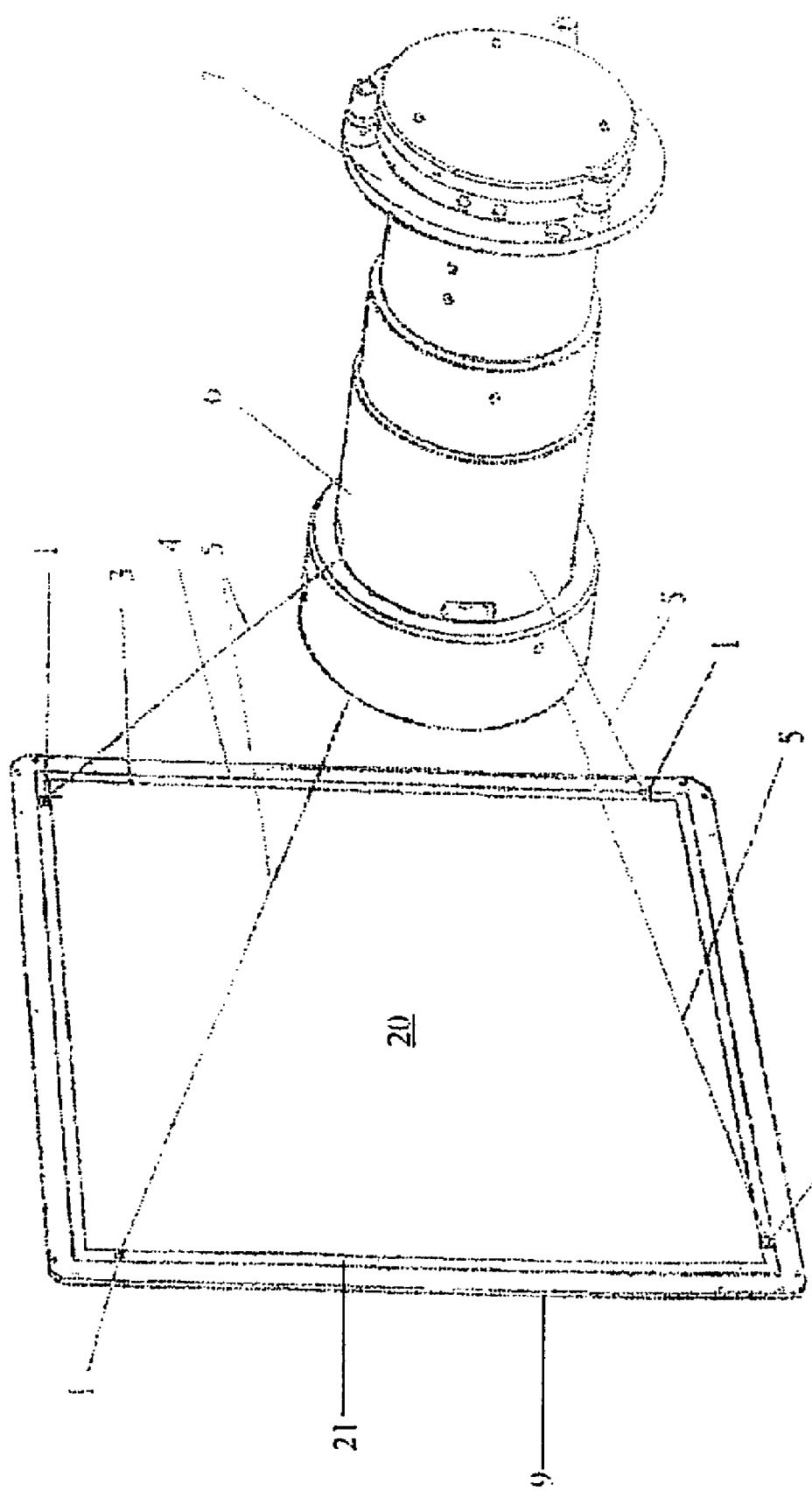
FIG. 1 shows a digital X-ray detector.

Figures in the drawings stand for:

1—test structure,
2—source of visible light,
3—boundary of the emitting surface of the radiographic screen,
4—visible field boundary in the radiographic screen plane, 5—the ray projecting a visible light source on the input lens of an objective lens, 6—objective lens, 7—a sensor unit based on a photosensitive CCD-matrix, 8—radiographic screen substrate, 9—radiographic screen.

Figure 2:
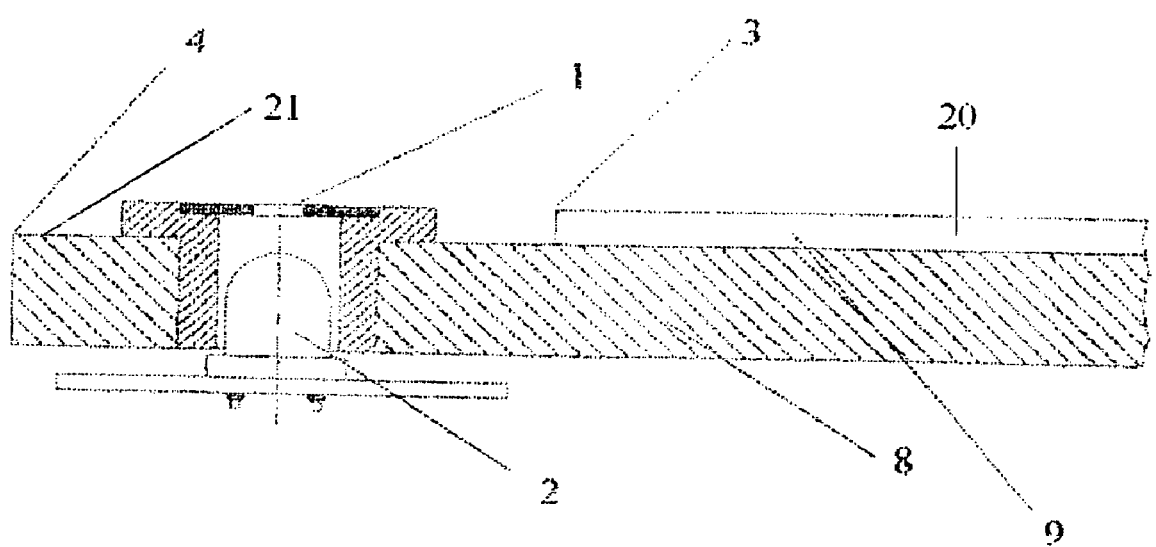
FIG. 2 gives in more detail a test structure with a visible light source based on a light-emitting diode.

In a digital X-ray detector, on the substrate 8 of the radiographic screen 9, in the corners, between boundary 3 of the radiographic screen 9 emitting surface 20 (FIGS. 1 and 2) and visible field boundary 4, there are installed the sources 2 of visible light (hereinafter referred to as sources) based on light-emitting diodes with test structures 1 installed in the emission plane 21. As shown in FIG. 2, every test structure is arranged in the direct path of rays from the said sources. Image of each test structure 1 is transferred by projecting rays 5 (FIG. 1) onto the input lens of the objective lens 6, and by the objective lens 6 is transmitted further into the sensor unit 7.

The system operates in the following way. During the X-ray detector calibration, the X-ray radiation impacts the radiographic screen 9 and is converted into visible radiation. The image of each test structure 1 illuminated by the light source 2 is processed in the image processing unit and stored as a reference frequency-contrast characteristic (hereinafter referred to as FC-characteristic) as calibration data corresponding to its fitness for operation. When the X-ray detector is in the operating mode, the light sources 2 are synchronized with the sensor 7 so that image sharpness setting is tested immediately before or immediately after taking every radiographic image depending on operation mode. When taking each radiograph, images are registered of each test structure 1 illuminated at that instant by a light source 2, the test structure 1 being arranged in the direct path of projection rays 5 of the latter source, and their FC-characteristics are computed. Then, the obtained FC-characteristics are compared with the reference FC-characteristics taken during the X-ray detector calibration. If the FC-characteristics of each test structure 1 fail to satisfy the requirement of sameness in the specified range, operation of the X-ray detector is stopped. Diagnostic testing intervals are determined based on the chosen method of X-ray detector checking.

Due to the fact that the sources of visible light with test structures are located between the radiographic screen emitting surface boundary and the boundary of the visible field, this system is not limited by the type of employed radiographic screen and does not require spectral filtration of optical signal, eliminating thereby partial loss of input signal. This excludes all the possible errors and inaccuracies associated with coincidence of primary UV source (UV lamp) spectrum with the radiographic screen secondary emission spectrum, optical system transmission spectrum and X-ray detector sensitivity spectrum.

BEST EMBODIMENT OF THE INVENTION

The best embodiment of the invention is a self-diagnostic system of a digital X-ray detector incorporating a radiographic screen located in the radiation pathway from the X-ray source, an optical system for image transfer from the screen onto a photosensitive CCD-matrix whose output is connected with the image processing unit, wherein there are four test structures installed in the corners of the screen frame. Each test structure is illuminated by controlled light-emitting diodes emitting in a visible range, which are installed in such a manner that each test structure is located in the emission pathway of the said sources.

INDUSTRIAL APPLICABILITY

The claimed self-diagnostic system of a digital X-ray detector is developed using known components and devices. As evidenced by the experience, the system makes it possible to cut down the risks of making wrong diagnosis based on X-ray images by means of self-testing the digital X-ray detector image sharpness setting using, excluding thereby the possibility of using the detector that is inoperative from the viewpoint of image sharpness parameter. Such a fault is possible, for example, at excessive mechanical loads on the detector at improper transportation or wrong operating methods.

While this invention has been particularly shown and described with references to preferred embodiments thereof, it will be understood by those skilled in the art that various changes in form and details may be made therein without departing from the scope of the invention encompassed by the appended claims.

What is claimed is:

1. A self-diagnostic system for a digital X-ray detector comprising:
    a radiographic screen for X-ray radiation comprising
        an emission plane and
        an emitting surface within the emission plane,
    an optical system for image transfer from the radiographic screen to a photosensitive CCD-matrix,
    at least three test structures within the emission plane of the radiographic screen outside of the emitting surface, and
    at least three sources of primary radiation, each source corresponding to one of the test structures,
    wherein each source emits the primary radiation directly onto the test structure corresponding to the each source and
    wherein the emitted radiation from each source passes through the test structure corresponding to the each source to the photosensitive CCD-matrix.

2. The system as claimed in claim 1, wherein the sources are light-emitting elements having the maximum of spectral response characteristic close to transmitting spectrum maximum of the image transfer optical system.

3. The system as claimed in claim 1, wherein the sources are light-emitting diodes emitting in the visible range.

4. The system as claimed in claim 2, wherein the sources are light-emitting diodes emitting in the visible range.

* * * * *